Dec. 16, 1969    T. H. PEIRCE    3,484,063
FLEXIBLE MOUNTING FOR VIBRATORY LOADS
Filed Sept. 12, 1967    2 Sheets-Sheet 1
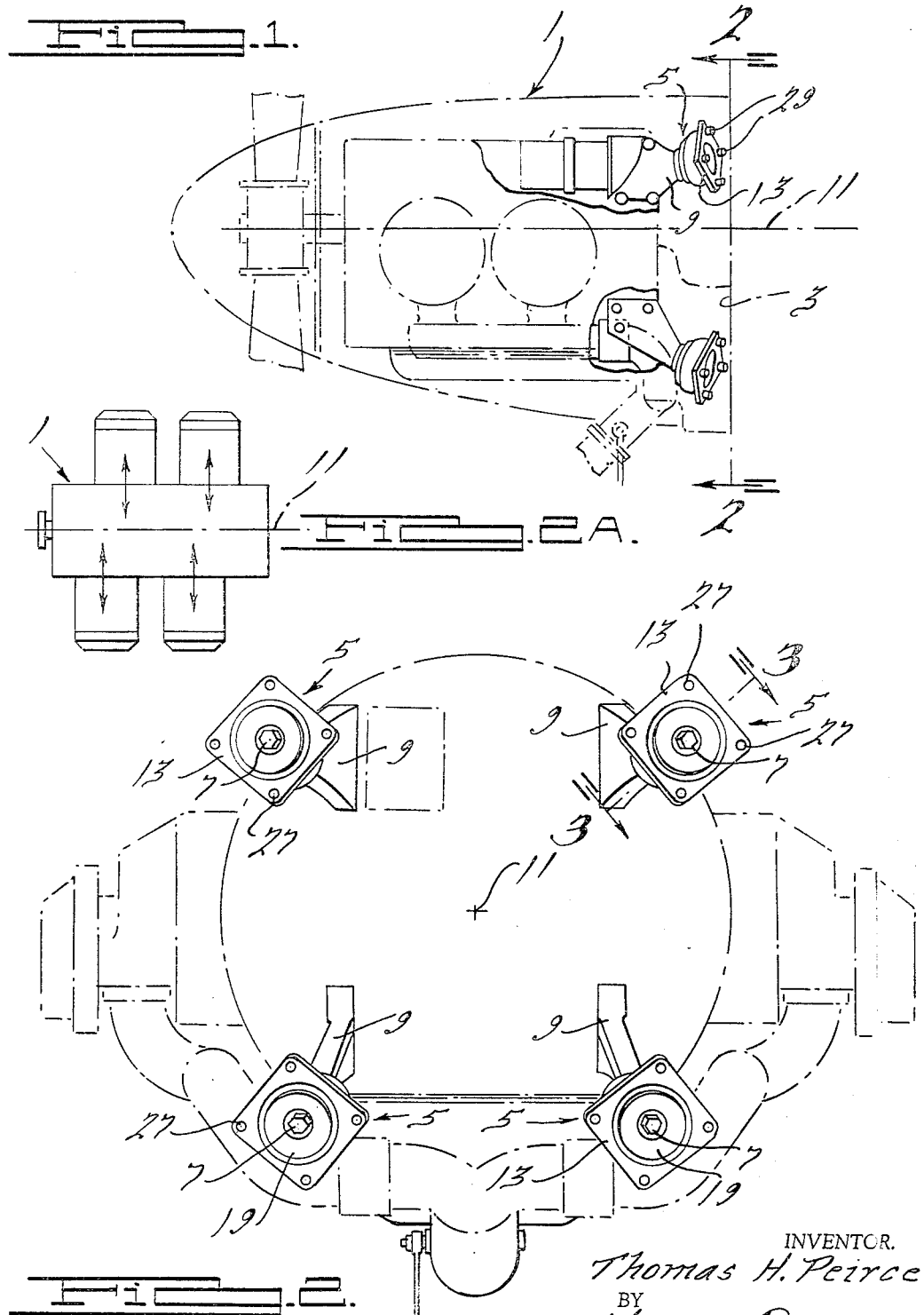
INVENTOR.
Thomas H. Peirce

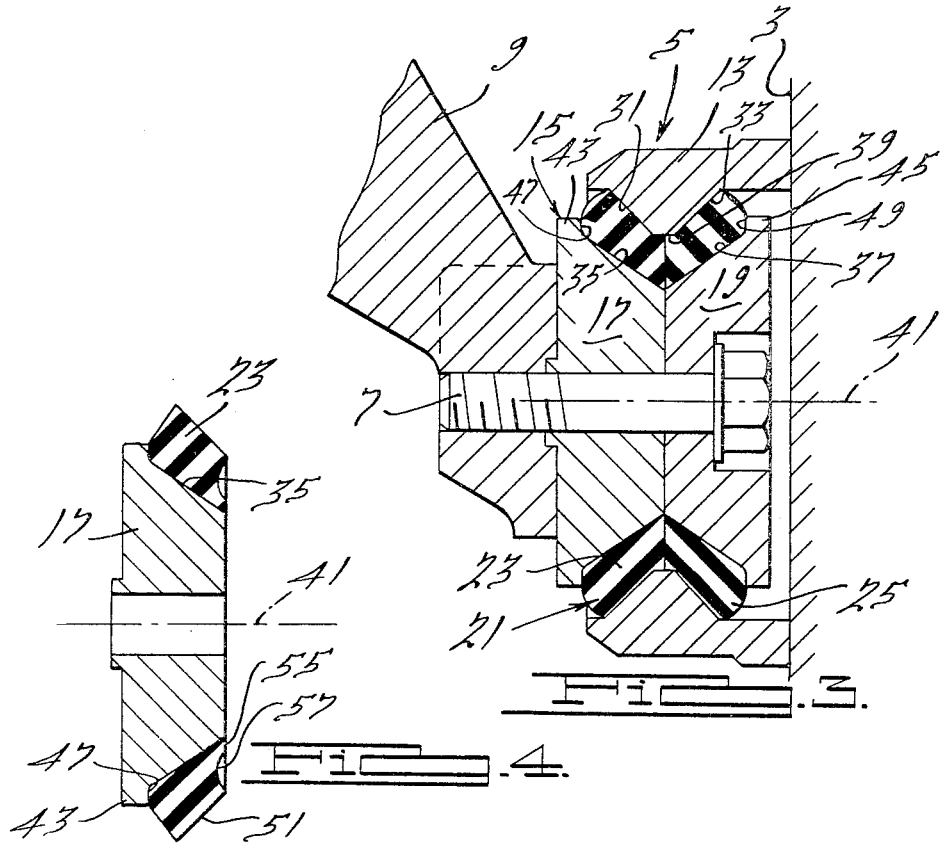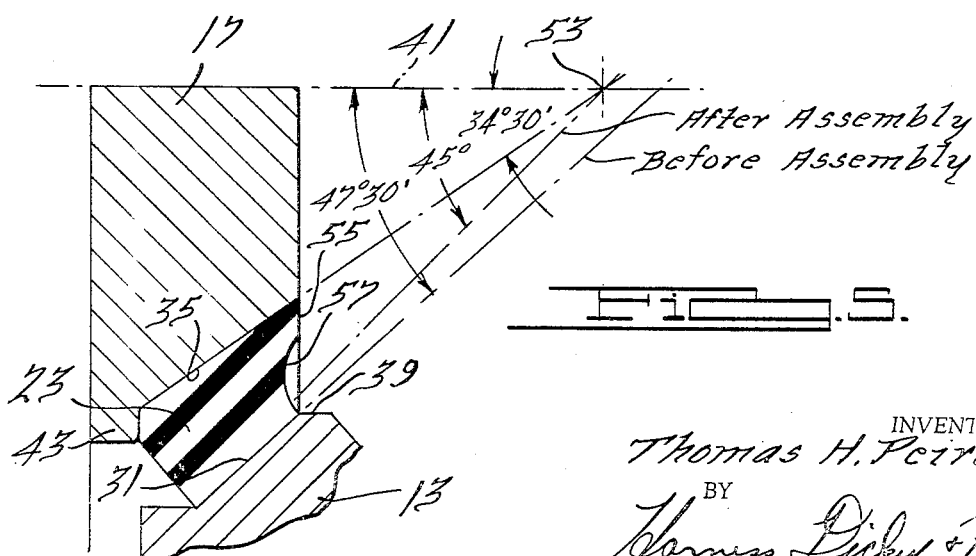

United States Patent Office 3,484,063
Patented Dec. 16, 1969

3,484,063
FLEXIBLE MOUNTING FOR VIBRATORY LOADS
Thomas H. Peirce, 16725 Shaftsbury,
Detroit, Mich. 48219
Filed Sept. 12, 1967, Ser. No. 667,118
Int. Cl. F16m 1/02; B64d 27/26; B64c 1/16
U.S. Cl. 248—5                       6 Claims

ABSTRACT OF THE DISCLOSURE

A three or four unit vibration absorbing mounting system for aircraft engines utilizes individual mounting units in which a pair of abutting conical variable cross section rubber rings are preloaded and serve to resiliently interconnect conically shaped inner and outer members for transmitting load from the engine into the frame of the aircraft.

BRIEF SUMMARY OF THE INVENTION

It is the purpose of the invention to provide a stable, motion controlled, highly efficient vibration absorber of simple construction which may be used in groups of several units as a means for mounting a vibrating body such as an airplane engine. In preferred form the invention comprises a mounting wherein a pair of conically shaped, variable thickness rubber rings abut each other and serve to resiliently interconnect inner and outer members.

DESCRIPTION OF THE DRAWINGS

FIGURE 1 is a side elevation of an aircraft engine (shown in phantom lines) ready for mounting on a bulkhead through the medium of vibration absorbers embodying the invention;

FIGURE 2 is an enlarged end view taken from the right of FIGURE 1;

FIGURE 2A is a schematic plan view of the engine of FIGS. 1 and 2;

FIGURE 3 is an enlarged cross section through an absorber of this invention shown in assembled, compressed condition, as taken on line 3—3 of FIGURE 2;

FIGURE 4 is a cross section through one of the inner members of the absorber; and FIGURE 5 is an enlarged view of a portion of the number shown in FIGURE 4 and illustrates the angular relationship of various surfaces prior to preloading.

DESCRIPTION OF THE INVENTION

A horizontal cylinder airplane engine 1 is supported cantilever fashion on a firewall 3 of an airplane fuselage or cabin (not shown) by means of four resilient or flexible, vibration absorbing couplings or mountings 5 constructed in accordance with the present invention which are secured by bolts 7 to brackets 9 projecting from the rear of the engine 1. The bolts 7 define the centerline and axis of symmetry 41 of each mounting and this axis of each mounting is disposed so that it intersects the axis 11 of the engine crankshaft. The four mountings 5 are substantially in a common vertical plane normal to the crankshaft axis and are arranged so that they are equally spaced from and symmetrical with respect to the crankshaft axis. The engine 1 that is illustrated is a four cylinder unit designed for small single engine aircraft. While four identical mountings 5 are illustrated, it is possible to satisfactorily mount the engine by means of three mountings 5 in which case one of the mountings would be somewhat larger but otherwise of the same construction as the other two.

Each mounting 5 comprises an outer housing member 13 and an inner insert member 15 which actually consists of two abutting pieces 17 and 19. The outer and inner members 13 and 15 are interconnected by a rubber body 21 which actually consists of two abutting pieces 23 and 25. The outer member 13 has bolt holes 27 by means of which it is rigidly secured to the firewall 3 by bolts 29.

The outer member 13 has converging conical inner faces 31 and 33 and confronting these faces and spaced from them are converging conical faces 35 and 37, respectively, on the inner members 17 and 19. The faces 31 and 33 terminate at their inner diameters at opposite ends of a cylindrical surface 39 which is coaxial with the axis 41 of the mount. The minimum diameter ends of the faces 35 and 37 intersect at the midplane of surface 39 when the bolt 7 is tightened to compress the rubber bodies 23 and 25. The inner members 17 and 19 have flanges 43 and 45 at their outer ends which define radial surfaces or shoulders 47 and 49 which are larger in diameter than the surface 39 and provide a positive safety against disassembly of the mount in case of destruction of the rubber as well as bumper means for the ends of the rubber bodies.

The conical faces on the inner and outer members converge toward each other in the direction of decreasing diameter to provide tapering cross sectional space as indicated in FIG. 5 wherein the preferable amount of convergence prior to assembly is indicated as 13°. The rubber bodies are preferably bonded to the conical faces on the inner members and shaped as indicated in FIG. 4 and their outer faces 51 are preferably formed on the same angles as faces 31 and 33. The rubber bodies are initially thicker than the assembled space between the inner and outer conical faces and therefore are compressed when the parts are assembled by means of bolt 7. After such assembly the conical inner and outer faces define surfaces that intersect the axis 41 at substantially the same point 53 and the convergence between them is preferably about 9°30' as indicated in FIGURE 5. The inner ends 55 of the rubber rings 23 and 25 have arcuate, annular recesses 57 to accommodate flow of the rubber when it is compressed at assembly. As seen in FIGURE 3, the inner ends of the two rubber rings 23 and 25 are compressed against each other upon assembly to form the rubber mass 21 connecting the engine 1 to the bulkhead 3.

The configuration and arrangement illustrated provides for very efficient use of the rubber which tests show results in a marked improvement in vibration absorption for the particular engine illustrated. The mountings are quite stable and flexibility is limited and movement is controlled in any plane. Side thrust is taken on the large diameter rather than on flanges or ears.

Modifications and other applications may be made without departing from the spirit and scope of the invention.

I claim:

1. A flexible coupling comprising an outer member having a pair of inner axially separate conical faces and an inner member disposed inside the outer member having a pair of outer axially separate conical faces, said conical faces being coaxial and the inner and outer conical faces defining a pair of spaces of V-shaped cross section in a plane through the axis of the coupling, said cross sections of each space tapering in width on each leg of the V and being narrowest at the apex of the V and each apex being located adjacent the other and adjacent the axial midpoint of the coupling, and a pair of separate conical rubber rings compressed respectively between each pair of said conical faces and abutting each other on their minimum diameters at the apex of each V and having tapering cross sections corresponding to the taper of the spaces.

2. A coupling as defined in claim 1 wherein the inner abutting ends of the rubber rings have annular recesses formed therein to accommodate flow of the rubber under compression.

3. A coupling as defined in claim 2 wherein said outer member is of one piece and has a cylindrical surface separating the two conical faces.

4. A coupling as defined in claim 3 wherein said inner members have shoulders engaging the outer ends of the rubber rings.

5. A coupling as defined in claim 4 wherein the rubber rings are bonded to the inner member.

6. A coupling as defined in claim 5 wherein said inner member is formed of two separate conical disks abutting face to face and including a bolt for holding the disks together and for securing the coupler to an object to be supported.

References Cited

UNITED STATES PATENTS

| | | | |
|---|---|---|---|
| 1,792,872 | 2/1931 | Saurer | 248—9 |
| 1,815,442 | 7/1931 | Masury | 248—5 |
| 1,872,259 | 8/1932 | Eldridge | 248—9 |
| 1,892,065 | 12/1932 | Markey | 248—5 |
| 2,261,955 | 11/1941 | Browne | 248—5 |
| 2,401,449 | 6/1946 | Yates | 248—5 |
| 2,465,790 | 3/1949 | Campbell | 248—5 |
| 2,523,504 | 9/1950 | Ford | 248—5 |
| 2,715,508 | 8/1955 | Small | 248—5 |
| 2,722,391 | 11/1955 | Krieghoff | 248—5 |
| 2,900,182 | 8/1959 | Hinks | 267—57.1 |

ROY D. FRAZIER, Primary Examiner

J. FRANKLIN FOSS, Assistant Examiner

U.S. Cl. X.R.

248—9, 15; 267—1, 21